Nov. 24, 1970

L. G. MILLER

3,543,121

JERK LIMIT CIRCUIT FOR TRACTION MOTOR CONTROL SYSTEMS

Filed March 6, 1968

WITNESSES:

Helen M. Farkas

James F. Young

INVENTOR
Lalan G. Miller

BY *[signature]*

ATTORNEY

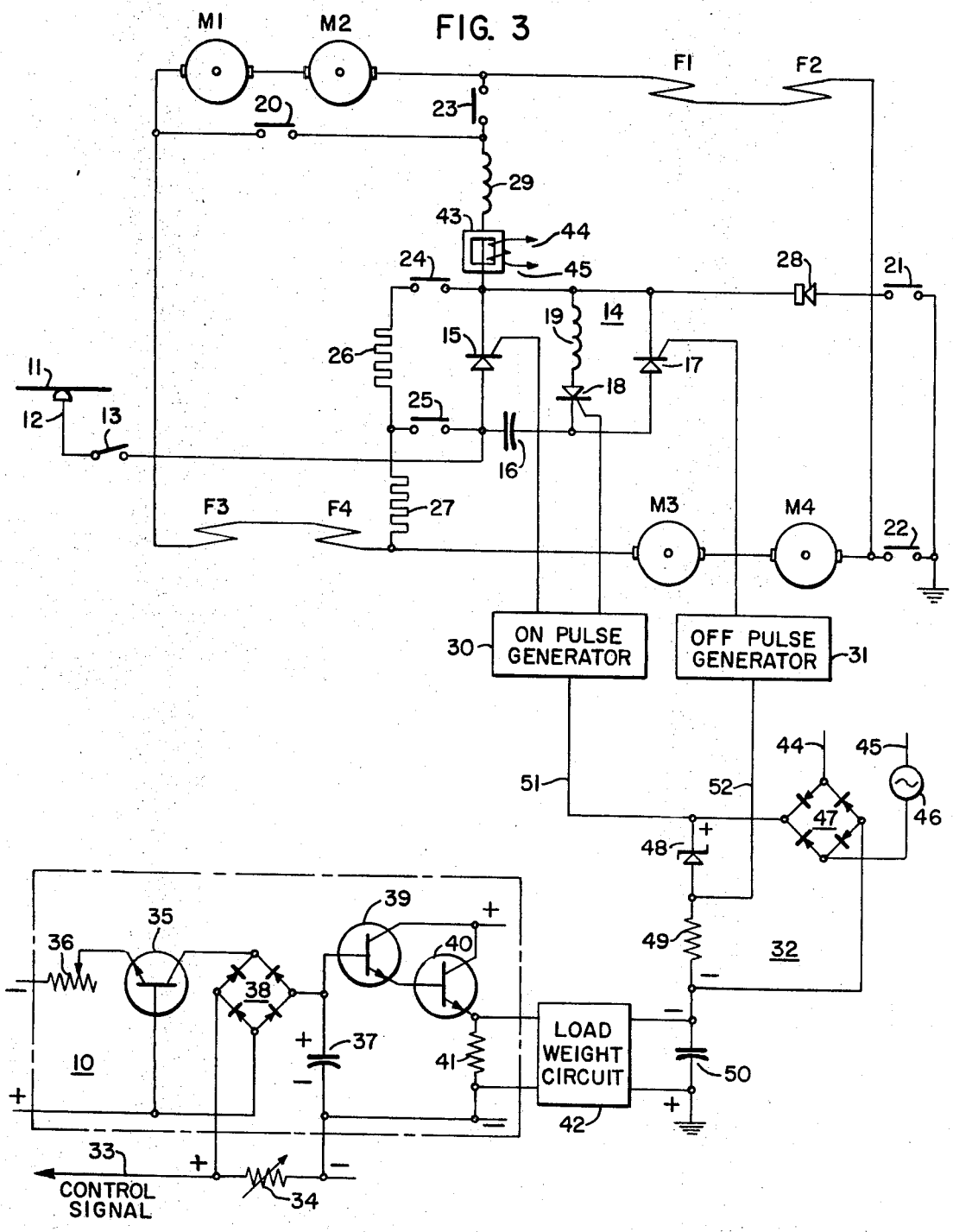

United States Patent Office 3,543,121
Patented Nov. 24, 1970

3,543,121
JERK LIMIT CIRCUIT FOR TRACTION MOTOR CONTROL SYSTEMS
Lalan G. Miller, Pittsburgh, Pa., assignor to Westinghouse Electric Corporation, Pittsburgh, Pa., a corporation of Pennsylvania
Filed Mar. 6, 1968, Ser. No. 711,103
Int. Cl. H02p 1/04
U.S. Cl. 318—393                      3 Claims

ABSTRACT OF THE DISCLOSURE

A circuit, primarily intended for use in traction motor control systems, for limiting the rate of change of an incoming control signal to a predetermined maximum to limit the rate of change of acceleration or deceleration of the motors to an acceptable value of safety and comfort of passengers.

---

The present invention relates to control systems which operate in response to a control signal, such as traction motor control systems, and more particularly to a circuit for limiting the rate of change of the control signal.

While the present invention is applicable to any type of motor control system which operates in response to a control signal, it is primarily intended for use in control systems for the propulsion motors of rapid transit cars. Direct current series motors are commonly used for propelling rapid transit cars and they are controlled by varying the voltage or current to control the speed or acceleration. Heretofore this has usually been done by means of resistors in the motor circuit which were cut out in steps by switches or contactors to change the voltage applied to the motors. The rate of acceleration was controlled by means of a limit relay responsive to the motor current which controlled the progressive operation of the contactors and thus determined the rate of acceleration, only a single rate of acceleration usually being available. The rate of deceleration when the motors were connected for dynamic braking was similarly controlled by cutting out a resistor in steps under the control of the limit relay.

New types of control systems are now coming into use, however, utilizing semiconductor devices such as direct current choppers or phase controlled rectifiers for controlling the motor current. These systems are completely static and offer many advantages, such as reduced maintenance with increased reliability, and infinitely variable rates of acceleration and of dynamic braking. Systems of these types operate in response to a control signal which represents the motor current necessary to obtain the desired tractive effort or braking effort, and thus are well adapted for use with automatic train control systems.

Static systems utilizing semiconductor switching devices are of course capable of extremely rapid operation and will follow changes in the control signal almost instantaneously. Since the control signal may change abruptly to call for a different motor current, extremely high rates of acceleration or of braking can occur if the control signal is applied directly to actuate the semiconductor switching devices. For rapid transit service, however, such abrupt and rapid changes in the rates of acceleration or braking are not permissible because of the discomfort or danger to passengers. For passenger comfort and safety therefore it is necessary to limit the rate of change of acceleration to a predetermined maximum, a generally acceptable maximum rate being approximately two miles per hour per second per second, for example. This maximum rate of change of acceleration must not be exceeded and it is necessary therefore for the control system to include some means for limiting the rate of change of acceleration, frequently referred to as jerk limiting, which will limit the rate of change of the motor current even though the control signal to which the system responds may change more rapidly.

The present invention has as its principal object to provide a jerk limit circuit, or rate of change of acceleration control, which will limit the rate of change of a control signal by modifying the signal and supplying an output signal for application to the control system which will follow the original control signal but will change at a slower rate limited to a predetermined maximum value to maintain the rate of change of acceleration at an acceptable level.

Briefly, the invention provides a circuit to be incorporated in a control system for traction motors. The incoming control signal is applied to this circuit, and the circuit provides an output representing a modified control signal which follows the incoming control signal but which changes more slowly and does not exceed a predetermined maximum rate of change. This modified output signal is then applied to the motor control system as the signal to which it responds. The circuit of the invention utilizes a transistor with a capacitor connected in its collector circuit to be charged by the incoming control signal. The rate of charge or discharge of the capacitor as the incoming signal changes is controlled by the emitter current of the transistor which is adjusted to limit the rate of charge or discharge to a desired maximum. The voltage across the capacitor then provides an output voltage which follows the control signal, but with a limited rate of change, and which can be used as a modified control signal for application to the control of the motors.

The invention will be more fully understood from the following detailed description, taken in connection with the accompanying drawings, in which:

FIG. 3 is a simplified schematic diagram of a complete traction motor control system utilizing a slightly modified form of the invention.

Figure 1:
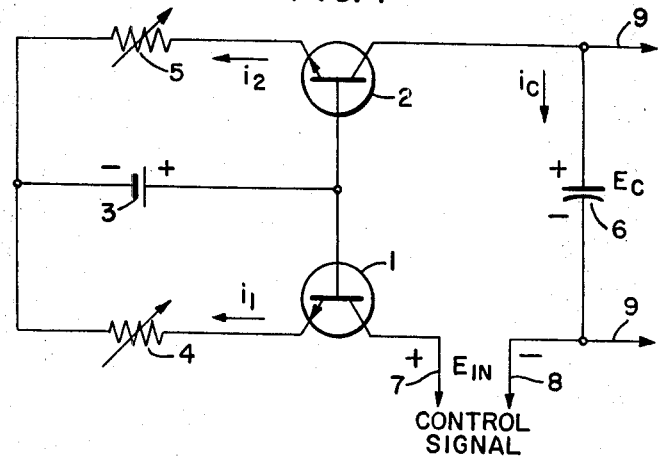
FIG. 1 is a schematic diagram showing an illustrative embodiment of the invention.

The basic circuit of the present invention is shown in the schematic diagram of FIG. 1. This circuit includes two transistors 1 and 2 with their bases connected together as shown. A direct current source 3 is provided to supply emitter current to both transistors. The direct current source 3 may be of any suitable type which provides a substantially constant voltage. NPN transistors are shown in the illustrative embodiment and the positive side of the voltage source 3 is connected to the bases of both transistors as shown. The negative side of the voltage source 3 is connected to the emitter of transistor 1 through an adjustable resistor 4 and to the emitter of transistor 2 through an adjustable resistor 5. Thus the voltage source 3 supplies emitter current to both transistors and the emitter currents are independently adjustable by means of the resistors 4 and 5. The collector circuit of the transistors includes a capacitor 6 connected across the collectors as shown and an incoming control signal is applied to the collector circuit through leads 7 and 8. The control signal is in the form of a direct current voltage with polarity as shown which, in effect, is in series with the capacitor 6 through the collectors of the transistors to charge the capacitor.

In the operation of this circuit, constant emitter currents $i_1$ and $i_2$ flow through the emitter circuits of the transistors 1 and 2, respectively, the magnitudes of the emitter currents being determined by the adjustment of the resistors 4 and 5. The capacitor 6 is charged by the control signal voltage and, if the control signal is constant, the voltage $E_c$ across the capacitor will be substantially equal to the control signal. If the control signal changes, the capacitor 6 will either charge or discharge and its voltage will change accordingly.

If the control signal voltage $E_{in}$ increases so that it is greater than the capacitor voltage $E_c$, a collector current $i_c$ will flow in the direction shown in the drawing to charge the capacitor. The magnitude of this current will be $$i_c = i_1 \alpha_1$$

where $\alpha_1$ is the forward current transfer ratio of transistor 1. The collector current $i_c$ is in the forward direction of the base-collector junction of transistor 2 and therefore flows through transistor 2 unaffected by the emitter current $i_2$.

The voltage of the capacitor 6 therefore will be $$E_c = \frac{1}{c} \int_0^t i_c dt + E_{c0}$$

$$= \frac{1}{c} i_1 \alpha_1 t + E_{a0}$$

where $E_{c0}$ is equal to $E_c$ at $t=0$. It will be seen from this equation that the capacitor voltage $E_c$ increases linearly with time at a rate determined by the emitter current $i_1$. If the control signal voltage is steady, the capacitor voltage will rise linearly with time until the capacitor voltage equals the control signal. As the capacitor voltage approaches the value of the control signal voltage, the collector current will decrease and the capacitor voltage will remain equal to the control signal voltage.

If the control signal voltage $E_{in}$ decreases and becomes less than the capacitor voltage $E_c$, the capacitor will discharge and the collector current will be $$i_c = -i_2 \alpha_2$$

Substituting this in the equation for capacitor voltage given above, it will be seen that the capacitor will discharge at a constant rate determined by the emitter current $i_2$, the collector current flowing through the base-collector junction of transistor 1 in the forward direction so that it is unaffected by the emitter current $i_1$. Thus the capacitor will discharge at a constant rate determined by the emitter current $i_2$ until its voltage has become equal to the control signal voltage.

It will be seen that in the operation of this circuit, the voltage of the capacitor 6 will follow the control signal voltage but will change more slowly and at a maximum rate determined by the respective emitter currents of the two transistors, which can be adjusted to set the desired maximum rate. The voltage of the capacitor 6 appearing across the terminal leads 9 therefore provides an output voltage which is in effect a modified signal voltage which follows the incoming control signal applied to leads 7 and 8 but with a predetermined limited rate of change. This modified control signal can then be applied to a control system for controlling the acceleration or dynamic braking of traction motors.

Figure 2:
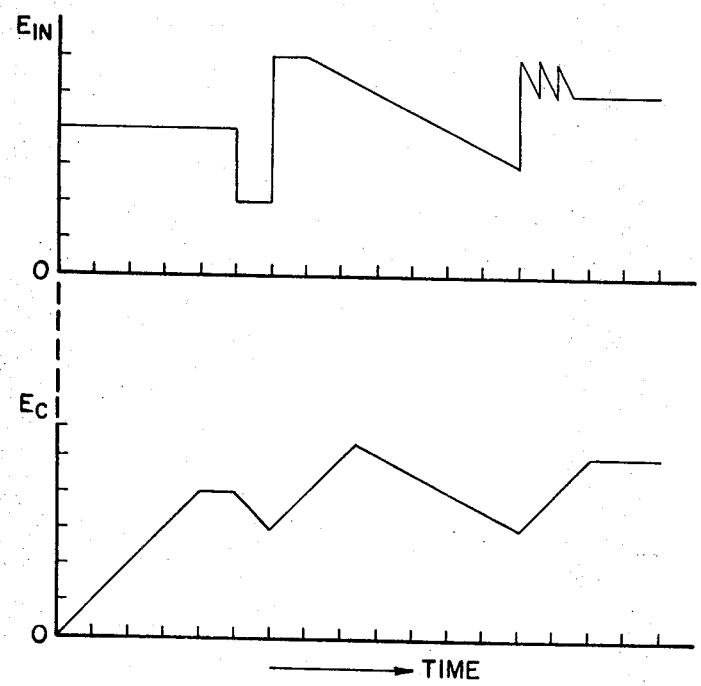
FIG. 2 is a set of curves illustrating the operation of the circuit of FIG. 1.

The operation of the circuit is illustrated by the curves of FIG. 2. In this figure the upper curve represents the control signal voltage $E_{in}$ applied to the leads 7 and 8 and illustrates a typical manner in which such a signal may change. It will be seen that the control signal may change abruptly, with a substantially instantaneous change from one value to another, or it may contain rapid oscillations. If such a signal were used to control the acceleration of traction motors, the car would be subjected to extremely rapid changes in acceleration with great discomfort and even danger to the passengers. If this signal is applied to the circuit of FIG. 1, however, the voltage $E_c$ across the terminals 9 will be as shown in the lower curve of FIG. 2. It will be seen that this voltage follows the control signal but that its rate of change is limited to a predetermined maximum, determined by the emitter currents of the transistors, and the modified signal thus obtained can be used to control the acceleration of the traction motors in accordance with the incoming control signal $E_{in}$ but with the rate of change limited to a predetermined maximum consistent with the safety and comfort of the passengers.

In the circuit of FIG. 1 different maximum rates of change may be obtained for increase and decrease in the control signal since the emitter currents of the transistors are independently adjustable. In many cases, however, the maximum rate of change desired is the same for either increase or decrease of the control signal, and in such cases the circuit can be simplified by omitting one of the transistors. A jerk limit circuit 10 modified in this way is shown in FIG. 3 applied in a complete traction motor control system.

FIG. 3 is a very much simplified schematic diagram showing a traction motor control system of the type disclosed in a copending application of J. M. Mills, Ser. No. 711,109 filed Mar. 6, 1968, and assigned to the assignee of the present application. As shown, there are two series-connected motors $M_1$ and $M_2$ having field windings $F_1$ and $F_2$, respectively, connected in series with the motors. A second pair of motors $M_3$ and $M_4$ are also connected in series with their field windings $F_3$ and $F_4$, respectively, the two pairs of series-connected motors being connected in parallel for power operation. Two pairs of motors in parallel are shown, in accordance with usual practice for the propulsion motors of rapid transit cars, but it will be understood that the system is applicable to a single motor or to any number of motors connected in any desired manner. Power is supplied to the motors from a third rail or trolley 11 through a current collector 12 and line switch 13.

The motor current is controlled by a direct current chopper 14 of any suitable type. The preferred type of chopper shown includes a thyristor 15 adapted to carry the total motor current, with a commutating capacitor 16 and a turn-off thyristor 17 connected across the thyristor 15 in the manner shown. An oppositely poled thyristor 18 and a reactor 19 are connected in a loop circuit with the capacitor 16 as shown. The chopper is started in operation by initially firing the thyristor 17 to permit the capacitor 16 to charge from the line, the thyristor 17 turning off when the charging current goes to zero. The chopper is then turned on by simultaneously firing thyristors 15 and 18. This permits current flow through thyristor 15 to the motors and at the same time completes an oscillatory circuit through the reactor 19 and thyristor 18 to capacitor 16. Current flows in this circuit from capacitor 16 to reactor 19 and back to the capacitor, thus charging the capacitor with its voltage reversed after which thyristor 18 turns off. The chopper is then in its on condition with thyristor 15 carrying the motor current. The chopper 14 is turned off by firing thyristor 17 which applies the reverse voltage of capacitor 16 across thyristor 15 to turn it off, the capacitor then again charging from the line through thyristor 17 which turns off when the charging current goes to zero. It will be understood that these operations of turning the chopper on and off take place very rapidly, in a few microseconds, and the chopper can be turned on and off repetitively at a very rapid rate.

The motor circuit also includes a set of power contacts 20, 21, and 22 and a set of braking contacts 23, 24, and 25. A braking resistor is also provided consisting of a relatively small resistor 27 and a relatively larger resistor 26 connected in series. A free wheeling diode 28 is connected as shown and a reactor 29 is preferably connected in series with the motors to smooth the motor current.

For power operation, the power contacts 20, 21, and 22 and the line switch 13 are closed and it will be seen that current flows from the third rail 11 through the line switch 13, the chopper 14 and the contact 20 to the two pairs of motors in parallel and then to ground through contact 22. The motor current is controlled by turning the chopper 14 on and off as required to maintain the desired average current, as more fully explained in the above mentioned Mills application. When the chopper is turned on, the motor current builds up to a desired maximum and the chopper is then turned off. The current in the highly inductive motor circuit decays to a desired minimum, flowing through contact 21 and the free wheeling diode 28, and the chopper is then again turned on. In this way the desired average motor current is maintained. For dynamic braking, the braking contacts 23, 24, and 25 are closed, the power contacts and the line switch being open. In this connection it will be seen that the motors are connected in a conventional braking circuit consisting of two loop circuits with a common branch containing the braking resistors 26 and 27 and with the chopper 14 connected across the resistor 26. The braking current is then controlled by turning the chopper on and off to cut the resistor 26 in and out of the circuit to maintain a desired average current corresponding to a desired braking effort.

The chopper 14 is turned on and off by means of gate pulses derived from an On pulse generator 30 which supplies gate pulses to thyristors 15 and 18, and an Off pulse generator 31 which supplies gate pulses to thyristor 17. Triggering signals for actuating the pulse generators are provided by a control circuit 32 which, in effect, compares the actual motor current with a control signal representing the desired motor current and signals the pulse generators to turn the chopper on or off as required.

The complete motor control system is controlled by a control signal applied through the conductor 33. The control signal is preferably in the form of a signal current which may be obtained from an automatic train control system of any suitable type, or from any other desired type of controller, and the magnitude of the control signal current represents the desired motor current for the necessary tractive effort or braking effort to obtain the desired rate of acceleration or deceleration of the car. A control signal voltage is derived from the signal on conductor 33 and is shown diagrammatically as the voltage across a resistor 34 which is indicated as being variable to represent the varying control voltage.

The control signal voltage across the resistor 34 is applied to the jerk limit circuit 10 to provide a modified signal voltage limited to a maximum desired rate of change. The circuit 10 includes a transistor 35 with emitter current supplied from a constant direct current source of any suitable type through an adjustable resistor 36. The collector circuit of the transistor 35 includes a capacitor 37 connected across the collector and base of the transistor is series with the control voltage at 34. Since the control signal voltage at 34 changes and may be either greater or less than the capacitor voltage, current may flow in either direction to or from the capacitor. The capacitor and signal voltage are therefore connected in the collector circuit through a rectifier bridge 38 which will permit current to flow in either direction while maintaining the correct direction of current through the collector and base of the transistor 35. It will be seen that the circuit 10 is essentially similar to the circuit of FIG. 1, except that only one transistor is used and the rectifier bridge 38 is included to allow for current flow in either direction to or from the capacitor 37. It will be apparent that the operation of this circuit is the same as that described above in connection with FIG. 1, and that when the control signal voltage 34 changes, the voltage across the capacitor 37 will change correspondingly to follow the control signal voltage but with a maximum rate of change determined by the emitter current of transistor 35 which can be adjusted by means of the resistor 36.

The voltage of the capacitor 37 thus provides a modified signal voltage which follows the incoming control signal on conductor 33 but which is limited to a desired maximum rate of change. In the preferred embodiment shown, the capacitor voltage is applied to the base of a transistor 39 which is connected to another transistor 40 in a tandem emitter follower circuit. A suitable direct current source is connected across the collectors and emitters of transistors 39 and 40, as shown, and this voltage source need not be regulated but should be greater than the maximum value of the control signal voltage at 34. A resistor 41 is connected between the emitter of transistor 40 and ground and it will be seen that the voltage across resistor 41 will be substantially equal to the voltage across the capacitor 37. The advantage of using this circuit is that the capacitor 37 is very lightly loaded as it has to supply only the relatively small base current of transistor 39. This permits the use of small values for the capacitor 37 and for the emitter current of transistor 35 and permits the use of small components to reduce the size and power dissipation of the complete circuit 10.

The voltage across resistor 41 therefore provides a signal voltage which follows the control signal at 33 but with the rate of change limited to the desired maximum for the safety and comfort of passengers, and this modified control signal voltage is applied to the control circuit 32 to control the motor current.

It will be appreciated that the necessary tractive effort or braking effort for a desired rate of acceleration or deceleration varies with the weight of the car, and it is necessary to further modify the control signal voltage so that the motor current actually maintained will be that required to produce the desired rate of acceleration or deceleration with the actual weight of the car at a particular time. The voltage signal across the resistor 41 therefore is preferably further modified by a load weight circuit 42 which measures the weight of the car and modifies the signal accordingly. Circuits for this purpose are known in the art but a circuit particularly suitable for this type of control system is disclosed in a copending application of L. G. Miller, Ser. No. 711,002, filed Mar. 6, 1968, and assigned to the assignee of the present application. The output voltage of the load weight circuit 42 is a suitably modified control voltage representing the motor current necessary to obtain the acceleration or deceleration called for by the control signal at 33.

This control voltage is applied to the control circuit 32 to be compared with the actual motor current. A signal voltage proportional to the motor current is obtained from a transductor 43 connected in the motor circuit to carry the total motor current in either the power or braking connection. The transductor 43 may be of any suitable type and the leads 44 and 45 of its alternating current winding are connected to a suitable source 46 of alternating current which may be derived from the car battery through an inverter, or which may be any other suitable source. The output current of the transductor is rectified by a rectifier bridge 47. The direct current output of the rectifier 47 therefore provides a voltage which is proportional to the motor current and which is applied to the control circuit 32.

The control circuit 32 includes three impedance means connected in series. In the illustrative embodiment these consist of a Zener diode 48, a resistor 49 and a capacitor 50. The voltage obtained from the rectifier 47 is applied across the Zener diode 48 and resistor 49 in series, as shown, and the control signal voltage from the circuit 42 is applied across the capacitor 50, the polarities of these two voltages being opposing as indicated on the drawing. A conductor 51 is connected to the upper end of the diode 48 to provide a triggering signal to the On pulse generator 30 and a conductor 52 is connected to the junction between the diode 48 and resistor 49 to provide a triggering signal to the Off pulse generator 31.

If the voltage across the diode 48 and resistor 49 is greater than the control signal voltage across capacitor 50, there is a positive resultant voltage at conductor 51. If the motor current decreases so that the voltage across diode 48 and resistor 49 becomes less than the voltage across capacitor 50, the voltage on conductor 51 will go negative and this triggers the On pulse generator 30 to turn on the chopper 14 so that the motor current can increase. When the motor current has increased by an amount corresponding to the voltage across the diode 48, the voltage on conductor 52 will become positive and this triggers the Off pulse generator 31 to turn the chopper 14 off. The pulse generators may be of any desired type which will operate in the manner described, but they are preferably of the type disclosed in the above mentioned Mills application to which reference is made for a detailed description of the operation of the pulse generators.

The chopper 14 is turned on and off in this way as required to maintain the desired average motor current. The voltage drop across the diode 48 represents the difference between the values of motor current at which the chopper is turned on and turned off and thus determines the amount of ripple in the motor current. It will be seen that in this way the motors are controlled in accordance with the incoming control signal at 33 to maintain the desired rate of acceleration or deceleration called for by the control signal.

The jerk limit circuit of the present invention is applied to this control circuit in the manner described above to modify the incoming control signal to limit the maximum rate of change of the signal so that the rate of change of acceleration or deceleration of the car is kept at a permissible value for the safety and comfort of the passengers. This circuit is relatively simple and inexpensive but is very effective and operates as previously described to provide an output signal which follows the incoming control signal but with a limited maximum rate of change. This circuit therefore is highly suitable for traction motor control systems. The circuit is shown applied in a particular type of control system for the purpose of illustration but it can equally well be used in other types of traction motor control systems, or in any type of control system utilizing semiconductor devices which can follow a control signal substantially instantaneously. In any such type of system it is usually necessary to limit the maximum rate of change of the control signal, for the reasons previously discussed, and the circuit of the present invention is very suitable for this purpose.

An illustrative embodiment of the invention has been shown and described for the purpose of illustration, but it will be apparent that various modifications and other embodiments are possible within the scope of the invention and it is not limited to the specific arrangement or circuit details shown but includes all equivalent embodiments and modifications.

I claim as my invention:

1. In a motor control system having semiconductor switching means for controlling the motor current and means for actuating the semiconductor switching means in response to a control signal, a circuit for limiting the rate of change of the control signal, said circuit comprising a transistor, means for applying a substantially constant voltage across the base and emitter of said transistor to supply emitter current thereto, means for adjusting said emitter current, a capacitor connected in the collector circuit of the transistor, means for applying said control signal to the collector circuit of the transistor to charge the capacitor, said collector circuit also including means permitting current to flow in either direction to charge or discharge the capacitor, and means for applying the voltage across the capacitor as a modified control signal for said control system.

2. A circuit as defined in claim 1 in which the collector circuit includes a rectifier bridge to permit current to flow in either direction to charge or discharge the capacitor.

3. A circuit as defined in claim 1 in which the collector circuit comprises a rectifier bridge having one pair of terminals connected across the base and collector of the transistor and with said capacitor and said means for applying the control signal connected in series across the other pair of terminals of the rectifier bridge.

References Cited

UNITED STATES PATENTS

| | | | |
|---|---|---|---|
| 2,929,980 | 3/1960 | Anger | 318—400 |
| 3,059,129 | 10/1962 | Tottingham | 307—265 |
| 3,163,812 | 12/1964 | Greening et al. | 318—291 |
| 3,317,756 | 5/1967 | Laporte | 307—229 |
| 3,337,786 | 8/1967 | Heyman et al. | 318—391 |
| 3,350,612 | 10/1967 | Hansen et al. | 318—392 |
| 3,387,205 | 6/1968 | Tesdall | 318—395 |
| 3,440,451 | 4/1969 | Honig | 307—293 |

ORIS L. RADER, Primary Examiner

K. L. CROSSON, Assistant Examiner

U.S. Cl. X.R.

318—395, 416